Jan. 2, 1945.   S. B. CRARY   2,366,493
ELECTRIC CIRCUIT
Filed Nov. 24, 1942
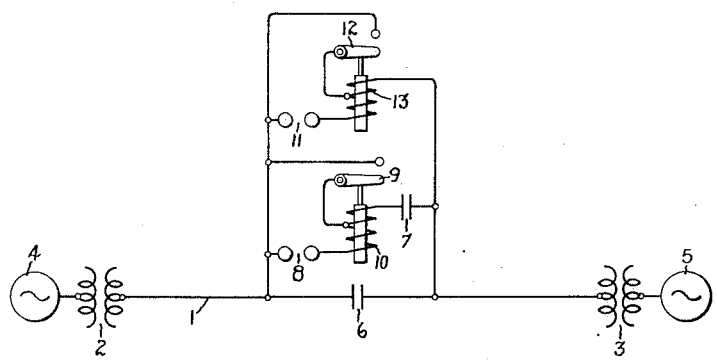
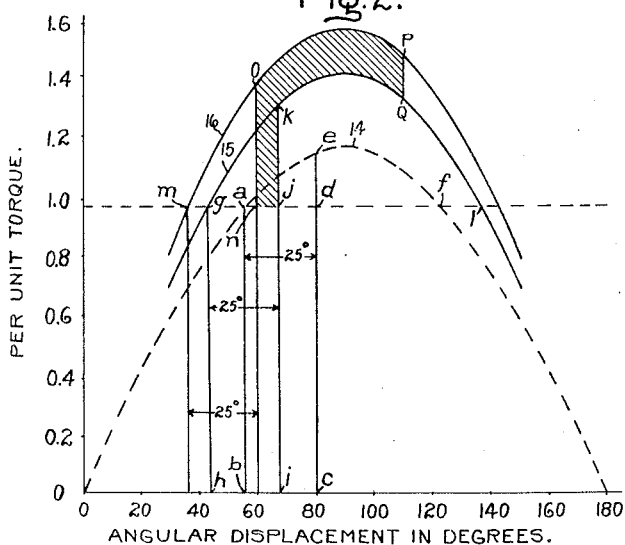
Inventor:
Selden B. Crary,
by Harry E. Dunham
His Attorney.

Patented Jan. 2, 1945

2,366,493

UNITED STATES PATENT OFFICE 2,366,493

ELECTRIC CIRCUIT

Selden B. Crary, Schenectady, N. Y., assignor to General Electric Company, a corporation of New York Application November 24, 1942, Serial No. 466,773

11 Claims. (Cl. 172—246)

This invention relates to electric circuits and more particularly to improvements in circuits containing series capacitors and to improvements in the method of operating such circuits.

As here used the term "series capacitor" means a capacitor which is effectively serially connected in an alternating-current power circuit so that its current is normally directly proportional to the current in the circuit. It may be connected directly in the circuit, or indirectly in the circuit by means of a series transformer or a shunt. It may be a single capacitor unit or a plurality of such units connected either in series with each other or in parallel with each other or in series-parallel with each other so as to give any desired overall capacitance or capacitive reactance and any desired overall kva. capacity or rating. By kva. capacity or rating is meant the maximum loading in thousands of volt-amperes that the capacitors can safely carry. As capacitors have substantially linear volt-ampere characteristics, their current and voltage are directly proportional to each other and thus their kva. loading is proportional to the square of their current or voltage. The maximum loading is a function of time because a capacitor can stand a higher loading for a short time than it can continuously. Its continuous rating is therefore lower than its short time rating.

The cost of a series capacitor is substantially proportional to its kva. rating and substantially independent of its capacitance or reactance. For example, one capacitor unit has the same capacitance and reactance that a series-parallel connection of four similar units (two in parallel with each other in series with the remaining two in parallel with each other) has but the latter has four times the cost and kva. capacity.

Series capacitors have the effect of neutralizing an amount of the circuits inductive reactance which is equal to their capacitive reactance. They thus reduce the overall reactance of the circuit. This is useful in the case of parallel power circuits as the relative reactance of such circuits controls the division of power carried by them. It is also useful in improving the voltage regulation of the circuit and in improving the power limits and stability of synchronous machines which are interconnected by the circuit or, in other words, improving the power limits and stability of synchronous-to-synchronous power systems which include the circuit.

It is for the latter use that my invention is especially adapted and in accordance therewith I provide a novel and simple method and system of control for series capacitors which enables them to increase the transient or dynamic stability of synchronous-to-synchronous power systems. Heretofore, it has been considered too expensive to keep series capacitors in the circuit during transient stability swings of a synchronous system because the large current surges would require very large series capacitor kva. capacity. Hence, the relatively small kva. and therefore inexpensive series capacitors were protected by short-circuiting them, which, in effect, removed them from the circuit and thus materially reduced the transient stability limit.

However, with my invention the amount of series capacitor kva. required to produce a given degree of transient stability is substantially reduced, or, conversely, the same amount of series capacitor kva. can be used to produce a substantially higher degree of transient stability.

An object of the invention is to provide a new and improved system and method of series capacitor control.

Another object of the invention is to provide a new and improved method and system of increasing the transient stability of a synchronous-to-synchronous power system.

A further object of the invention is to provide a new and improved method and system for reducing the cost of series capacitors which are used to increase the transient stability of a synchronous-to-synchronous power system.

Still another object of the invention is to provide an improved automatic series capacitor control system.

The invention will be better understood from the following description taken in connection with the accompanying drawing and its scope will be pointed out in the appended claims.

In the drawing Fig. 1 is a one-line schematic circuit diagram of an embodiment of the invention and Fig. 2 is a set of curves for illustrating how the invention increases the transient stability of a synchronous-to-synchronous system.

Referring now to the drawing and more particularly to Fig. 1, there is shown therein an alternating-current power circuit 1 which may be of any type, such, for example, as a three-phase long-distance high-voltage sixty-cycle-per-second transmission line of either the single or multi-circuit type. Connected to the terminals of this line by way of conventional step-up and step-down power transformers 2 and 3 are generating and receiving apparatus 4 and 5. This apparatus preferably comprises synchronous dynamo-electric machinery.

For neutralizing a predetermined amount of inherent distributed inductance of the line 1 a series capacitor 6 is connected therein.

Another capacitor 7 is arranged to be connected in parallel circuit relation with the series capacitor 6 in response to a function of an operating condition of the circuit 1. This automatic means is shown by way of example as a sphere gap 8 connected in series with the capacitor 7 across the capacitor 6. In order to protect the gap 8 and also in order to control disconnection or open circuiting of the second capacitor 7 a circuit maker and breaker 9 is connected in parallel circuit relation with the gap 8. This circuit maker and breaker is controlled by operating means shown by way of example as a winding 10 connected in series with the capacitor 7.

In order to protect both capacitors against overloading, another gap 11 is connected across the capacitor 6 and a switch 12 is provided for short-circuiting this gap. The operating means for the switch 12 is shown as a winding 13.

While only one main series capacitor 6 has been shown in the circuit, it should be understood that as many more such capacitors as desired may be placed in the circuit at any desired locations.

The operation of Fig. 1 is as follows: The capacitance of the gap 8 is very much smaller than the capacitance of capacitor 7 so that practically all of the voltage across the series capacotor 6 appears across the gap 8. The gap 8 is so calibrated that it arcs over when the voltage across the series capacitor 6 approaches the voltage corresponding to the maximum safe loading of the series capacitor 6. The capacitor 6 in turn is so proportioned that it can safely carry continuously the rated or full load current of the power system shown in the drawing so that only when the current in the circuit 1 exceeds normal rated current will the voltage of the capacitor 6 approach the voltage at which the gap 8 arcs over. For example, the capacitor 6 may have a continuous current rating corresponding substantially to the full load current rating of the system and it may have a short time current rating of twice its continuous current rating. Consequently, the gap 8 will be calibrated to arc over at a voltage of slightly less than the voltage corresponding to twice rated current through the capacitor 6. This voltage would correspond to a kva. loading of the capacitor of four times its normal rated kva. but would correspond to a loading of slightly below its maximum safe short time kva. loading.

When the gap 8 arcs over its voltage falls to a relatively low value so that the capacitor 7 is effectively connected in parallel circuit relation with the capacitor 6. This has the effect of increasing the effective series capacitance in the circuit and this in turn corresponds to a reduction in the amount of capacitive reactance or the amount of capacitor compensation in the circuit. It also substantially instantaneously reduces the loading and voltage of the series capacitor 6 because part of the line current will now flow through the capacitor 7. Thus, there is a two-part reduction in voltage across the series capacitor 6, one part being the result of the reduction in total current in the circuit 1 caused by the increase in its effective reactance which in turn is caused by the effective reduction in the amount of series capacitor compensation, and the other part being caused by the fact that a part of the total line current is diverted from the series capacitor 6 and flows through the capacitor 7.

In order to prevent a hunting or pumping action of the gap 8 and also in order to protect it against the effects of prolonged arcing which might interfere with its calibration the winding 10 which responds to the gap current is made to close the switch 9. As shown in the drawing, all of the gap current flows through the coil 10 but when the switch 9 closes its current flows through only part of the coil 10. This part of the coil may be so proportioned to the entire coil that the switch 9 is held closed until the current in the line 1 falls below the value it has immediately after the capacitor 7 is first effectively connected in parallel with the capacitor 6.

With the two capacitors in parallel the current in the circuit 1 may rise substantially above the maximum safe value which series capacitor 6 could carry alone. This increased current will divide in proportion to the capacitance of the respective parallel capacitors and if their kva. ratings are proportional to their capacitances, then they will both reach their maximum safe kva. loadings at the same value of total current and this is the most economical arrangement.

The second gap 11 is so proportioned that it arcs over at a voltage slightly higher than the voltage at which the gap 8 arcs over, thereby effectively short circuiting both of the capacitors. The current through the gap 11 flows through the winding 13 and causes the switch 12 to close, thereby short circuiting the gap and protecting it against the effect of prolonged arcing. The relation between the operating winding 13, the gap 11 and the switch 12 is similar to that between the winding 10, the gap 8 and the switch 9 so that the holding effect of the portion of the winding 13 through which the switch current flows is the correct amount to prevent a pumping action of the switch and intermittent breakdown of the gap 11.

Although only one additional capacitor 7 has been shown, it will, of course, be obvious that as many additional capacitors as desired may be provided and their respective gaps or switching means may be so correlated that they are sequentially connected in parallel with each other after the total circuit current continues to rise above a predetermined value.

It should be understood that the voltage responsive means for controlling the connections of the auxiliary capacitor 7 and the overvoltage protective means for all of the capacitors is merely illustrative of one form of apparatus for producing this operation and that probably no one form of apparatus would be suitable for all sizes and kinds of circuits. For example, in very high voltage transmission circuits it would probably be necessary to utilize power circuit breakers for controlling the connection and disconnection of the paralleling capacitor 7 and for controlling the short circuiting of both of the capacitors for protective purposes.

Fig. 2 shows three load angle curves which illustrate the improved transient stability which the present invention gives to a synchronous-to-synchronous system. As the average speed of a synchronous machine at any system frequency is substantially constant its torque can be understood to be directly proportional to the power it translates and consequently the ordinates of the curves are plotted in terms of per unit torque in which unit torque corresponds to rated full load torque or full load power. The abscissae of the curves are the angular displacement in degrees between the rotors or generated voltages of the synchronous machines 4 and 5. The curves are all shown as undisplaced sine curves because the power or torque which can be transmitted between synchronous machines is directly proportional to the sine of the angular displacement between their internal voltages, neglecting saliency effects and resistance losses. This power or torque is also inversely proportional to the impedance between these voltages. This includes the internal impedances of the machine themselves, the impedance of the transformers 2 and 3 and the impedance of the line or circuit 1. The angular displacement between the internal voltages of the machines is also a function of the voltage drop in the system or circuit between these two internal voltages; in other words, the two internal voltages and the voltage drop in the system make up a vector triangle. For the case of equal internal voltages the current is equal to twice this internal voltage times the sine of half the angular displacement all divided by the impedance between the internal voltage.

The dashed curve 14 is the load angle curve of the system shown in Fig. 1 with the capacitors 6 and 7 omitted so that the line is a conventional uncompensated line. The system is assumed to be operating at 96 per cent power factor and full kva. This is shown by the horizontal dashed line. The intersection between this line and the curve 14 is at point $a$ and this is the stable operating point of the system. Assume now that there is a severe disturbance on the system. For example, to take the most severe case, assume there is a dead short circuit of all of the phases of the system so that all synchronizing power between the machines is lost. Consequently, the electrical power drops substantially instantaneously to zero at point $b$ (neglecting the effect of resistance). Assume further that this fault is cleared by the time the angular displacement of the machines has increased 25 degrees. This point of clearing is shown at point $c$. At this instant the electrical power or torque on the machines increases substantially instantaneously but instead of stopping at the point $d$, corresponding to the same power which existed when the fault occurred, the power continues on up to the point $e$ which is the point on the load angle curve corresponding to the angular displacement then existing between the machine rotors. In the case of a synchronous generator the area $abcd$ is a measure of the increase in energy stored in the rotor of the machine during the time the fault was on. During this time the electrical load was zero but the mechanical power input to the machine stayed substantially at its original value so that the rotor was accelerated and thus gained energy. At point $e$ the electrical power output of the machine exceeds the mechanical power input by the amount represented by the vertical distance between points $d$ and $e$. Therefore, the machine starts to decelerate along the curve 14 but as it is still turning too fast the angular displacement is still increasing. At point $f$ the load angle curve reaches the line representing power input (for purposes of explanation losses in the machine are neglected so that power input at points $a$ and $f$ is equal to power output).

If the load angle continues to increase beyond the point $f$ the system becomes unstable and synchronism will be lost because beyond point $f$ the electrical power output decreases below the mechanical power input so that the prime mover (not shown) will then reaccelerate the rotor of the machine and the angle will increase further and further. The measure of transient stability is the ratio of the accelerating area $abcd$ to the decelerating area $def$ and for stability the latter must be greater than the former. In the diagram that is not the case and the system will fall out of step.

Curve 15 is the load angle curve of the system when it has a predetermined amount of capacitor compensation and the kva. capacity of this compensation is sufficient to ride through a stable swing of the system at rated power. Because the capacitor compensation reduces the reactance of the system the angular displacement is less than with no compensation for the same amount of power and voltage. Thus, the system with this predetermined amount of compensation will normally be operating at point $g$ corresponding to the intersection between the curve 15 and the .96 torque line. Assume now that the same fault occurs on the system so that the electrical power drops to zero at point $h$ and stays at zero for a 25 degree displacement until at point $i$ the fault is cleared. The electrical power then jumps up until at $j$ it crosses the .96 load line where it equals the mechanical power input but as in the previous case it continues on to point $k$, this being the point on the load angle curve 15 corresponding to the angular displacement existing at the instant the fault is cleared. The change in angular displacement then starts to decelerate along the curve 15 and the maximum stable displacement will be at point $l$. If the area $jkl$ is greater than the area $ghij$ the increase in angular displacement will stop some time before the point $l$ is reached and the angular displacement will then start to decrease as the electrical power output is greater than the mechanical power input. The angle will decrease until at point $g$ the power conditions will reverse. Consequently, the system angle will oscillate about the point $g$ and will finally settle down at point $g$ due to the inherent damping of the system which results from the losses in it.

The amount of compensation determines the capacitance of the series capacitor, and the angular displacement of the system at point $l$ determines the current in the system and as the series capacitor kva. is proportional to $I^2X$ the maximum capacitor kva. for a stable swing at rated power can readily be calculated. Assume now that this particular value of capacitor kva. corresponding to point $l$ be divided into the two parts represented respectively by the capacitors 6 and 7 in Fig. 1 and assume further that this division is so carried out that when the two parts are connected in parallel in a current carrying circuit their kva. loadings at any particular value of total current will be directly proportional to their kva. ratings. From this it follows that the capacitive reactance of each of the capacitors 6 and 7 is higher than that for the curve 15. Consequently, with only the capacitor 6 in circuit, the amount of compensation will be greater than that represented by curve 15 so that, for example, the new operating curve will be curve 16 having a normal operating point at $m$. If now the same fault is apppplied to the system over the same 25 degree angular swing, the electrical load will drop as before and then after the 25 degree swing will increase, crossing the mechanical power input line at point $n$, and continuing on to point $o$ on the curve 16. Assume now that at point $p$ the maximum safe kva. rating of the capacitor 6 is reached and consequently the automatic system of Fig. 1 connects the capacitor 7 in parallel therewith. This drops the electrical load down to the point $q$ on the curve 15 because when the capacitors 6 and 7 are connected in parallel the capacitor kva. and amount of compensation are the same as those represented in curve 15. Consequently, there has been an increased restoring or decelerating area $nopqkj$ created, which area is shown cross-hatched and which is created by virtue of the control system shown in Fig. 1.

It is of course not essential that any particular means be used to connect the capacitor 7 in parallel with capacitor 6 at point $p$ and it could even be done by the manual closure of switch 9.

While Fig. 2 has been described in connection with a dead short circuit such as a three-phase fault on a three-phase system, it should, of course, be understood that there are many other kinds of faults or disturbances which cause load angle swings in a synchronous-to-synchronous system. For example, the opening of a line section in a multi-section line or a double line to ground fault in a three-phase system also produce load angle swings.

While Fig. 2 illustrates how a given amount of capacitor kva. can be controlled so as to increase the restoring area for transient stability of a synchronous-to-synchronous system, it will also be apparent that conversely the amount of capacitor kva. can be substantially reduced while still keeping the same restoring area as before the reduction by controlling the capacitor compensation in accordance with the present invention. For example, in a typical case I have found that a reduction of 56 per cent in capacitor kva. may be obtained while keeping the same restoring area. The above figure of course refers to maximum kva. and not necessarily to rated kva. It is therefore possible to reduce the capacitor kva. substantially and at the same time increase the transient stability.

While the invention is particularly useful in increasing the transient stability limit of a synchronous system it is also useful in increasing the steady state stability limit of such a system. This is because it controls a given amount of capacitor kva. in such a way that the amount of capacitor compensation produced in the system up to the steady state stability limit of the system is greater than would be produced by the conventional connection of the same amount of capacitor kva.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, an alternating-current power line, a series capacitor connected therein, means responsive to a predetermined maximum safe loading of said series capacitor for automatically effectively short circuiting it, a second capacitor, and means responsive to a predetermined loading of said series capacitor which is slightly below said maximum safe loading for automatically effectively connecting said second capacitor in shunt circuit relation with said series capacitor.

2. In combination, an alternating-current power line, a series capacitor connected therein, said series capacitor having a maximum safe voltage, a second capacitor, means responsive to a predetermined voltage across said series capacitor which is slightly below said maximum safe voltage for automatically effectively connecting said second capacitor in shunt circuit relation with said series capacitor, and means responsive to a voltage between said predetermined voltage and said maximum safe voltage for automatically short circuiting both of said capacitors.

3. In combination, a synchronous-to-synchronous electric power transmission system, a main normally energized series capacitor connected in said system, a second normally deenergized series capacitor, and means responsive to the approach to maximum safe kva. operation of said main capacitor for automatically connecting said second capacitor in parallel circuit relation with said main capacitor and maintaining said parallel connection as long as system operating conditions are such as would overload said main series capacitor alone.

4. In combination, a synchronous-to-synchronous electric power transmission system, a main normally energized series capacitor connected in said system, a second normally deenergized series capacitor, and means responsive to the approach to maximum safe kva. operation of said main capacitor for automatically connecting said second capacitor in parallel circuit relation with said main capacitor, said second capacitor having a kva. rating so related to the kva. rating of said main capacitor that when they are in parallel circuit relation their loadings are in direct proportion to their ratings.

5. In combination, a synchronous-to-synchronous electric power transmission system, a plurality of capacitors constituting a series capacitor installation in said system, said installation having sufficient kva. capacity to withstand the stresses caused by the maximum system current for a stable swing of the system at rated power, and means for increasing the transient stability of said system comprising circuit controlling apparatus automatically responsive to the kva. loading of said capacitors for reducing their number in active service as the system current decreases in such a manner as to prevent overloading of any of the capacitors in service while at the same time increasing the capacitor compensation of the system.

6. The method of increasing the transient stability of a synchronous-to-synchronous electric power transmission system which comprises, providing a relatively large amount of series capacitor compensation for said system so as substantially to reduce the normal load angle of the system, limiting the maximum safe kva. capacity of said compensation to a value substantially less than what the maximum kva. loading of said compensation would be for a stable swing of said system at rated power, and reducing the amount of said compensation and simultaneously increasing its kva. capacity during a load swing so that the final maximum safe kva. capacity of said compensation at least equals the kva. loading thereof during a stable swing of said system.

7. The method of reducing the series capacitor kva. of a compensated synchronous-to-synchronous electric power transmission system without reducing its transient stability which comprises normally having a relatively large amount of capacitor compensation with inadequate kva. capacity to withstand the maximum current of a stable swing of the system at rated power, reducing the amount of capacitor compensation and increasing the amount of capacitor kva. during the decelerating portion of such stable swing.

8. The method of reducing the series capacitor kva. of a compensated synchronous-to-synchronous electric power transmission system while increasing its transient stability which comprises normally having a relatively large amount of capacitor compensation with inadequate kva. capacity to withstand the maximum current of a stable swing of the system at rated power, and simultaneously reducing the amount of capacitor compensation and increasing the amount of capacitor kva. during the decelerating portion of said stable swing whereby the restoring area gained under the load-angle curve by means of the relatively high initial capacitor compensation exceeds the restoring area lost under the curve because of the relatively low values of compensation at the end of said load swing.

9. The method of increasing the transient stability of a compensated synchronous-to-synchronous electric power transmission system without increasing its series capacitor kva. which comprises dividing said series capacitor into at least two groups, connecting one of said groups serially in said system, and connecting another of said groups in parallel circuit relation with the first group during the latter portion of a transient load angle swing of said system.

10. The method of utilizing a given amount of series capacitor kva. so as to increase the transient stability of a synchronous-to-synchronous electric power transmission system which comprises re-arranging the connections of said series capacitor kva. so as to reduce the amount of compensation it produces and increasing its active kva. capacity during the decelerating portion of a stable load-angle swing of said system.

11. The method of utilizing a given amount of series capacitor kva. so as to increase the steady state stability limit of a synchronous-to-synchronous electric power transmission system which comprises, having a portion of said capacitor kva. normally active and the remaining portion normally inactive, said active portion alone providing more capacitor compensation of said system than both portions together, and rendering said remaining portion active only after the steady state stability limit of the system has been passed.

SELDEN B. CRARY.